(12) United States Patent
Bao et al.

(10) Patent No.: US 8,738,861 B2
(45) Date of Patent: May 27, 2014

(54) DATA PREFETCHING METHOD FOR DISTRIBUTED HASH TABLE DHT STORAGE SYSTEM, NODE, AND SYSTEM

(71) Applicant: Huawei Technologies Co., Ltd., Shenzhen (CN)

(72) Inventors: Dong Bao, Shenzhen (CN); Deping Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/708,603

(22) Filed: Dec. 7, 2012

(65) Prior Publication Data

US 2013/0097402 A1    Apr. 18, 2013

Related U.S. Application Data

(63) Continuation of application No. PCT/CN2011/075352, filed on Jun. 3, 2011.

(30) Foreign Application Priority Data

Jan. 13, 2011   (CN) .......................... 2011 1 0006813

(51) Int. Cl.
  *G06F 12/08*   (2006.01)
  *G06F 9/45*    (2006.01)
(52) U.S. Cl.
  CPC .......... *G06F 12/0862* (2013.01); *G06F 8/4442* (2013.01)
  USPC ........................................................ 711/137
(58) Field of Classification Search
  None
  See application file for complete search history.

(56) References Cited

U.S. PATENT DOCUMENTS

| 2004/0117398 | A1 | 6/2004 | Idei et al. |
| 2005/0144394 | A1 | 6/2005 | Komarla et al. |
| 2010/0146569 | A1* | 6/2010 | Janardhan et al. ............. 725/98 |

FOREIGN PATENT DOCUMENTS

| CN | 1961286 A | 5/2007 |
| CN | 101304437 A | 11/2008 |
| CN | 101521553 A | 9/2009 |
| WO | WO 2005/066767 A1 | 7/2005 |
| WO | 2009/142685 A1 | 11/2009 |
| WO | 2010/076536 A2 | 7/2010 |

OTHER PUBLICATIONS

Extended European Search Report issued in corresponding European Patent Application No. 11783092.7, mailed Jul. 16, 2013, 9 pages.

(Continued)

*Primary Examiner* — Duc Doan
(74) *Attorney, Agent, or Firm* — Brinks Gilson & Lione

(57) ABSTRACT

Embodiments of the present disclosure provide a data prefetching method, a node, and a system. The method includes: a first storage node receives a read request sent by a client, determines a to-be-prefetched data block and a second storage node where the to-be-prefetched data block resides according to a read data block and a set to-be-prefetched data block threshold, and sends a prefetching request to the second storage node, the prefetching request includes identification information of the to-be-prefetched data block, and the identification information is used to identify the to-be-prefetched data block; and the second storage node reads the to-be-prefetched data block from a disk according to the prefetching request, and stores the to-be-prefetched data block in a local buffer, so that the client reads the to-be-prefetched data block from the local buffer of the second storage node.

15 Claims, 7 Drawing Sheets

(56) References Cited

OTHER PUBLICATIONS

Written Opinion of the International Searching Authority issued in corresponding PCT Patent Application No. PCT/CN2011/075352, mailed Oct. 20, 2011, 4 pages.

Li et al., ContinuStreaming: Achieving High Playback Continuity of Gossip-based Peer-to-Peer Streaming IEEE 2008, 12 pages.

Yin et al., "DHT Based Collaborative Multimedia Streaming and Caching Service" IEEE 2005, 6 pages.

Written Opinion of the International Searching Authority issued in corresponding PCT Application No. PCT/CN2011/075352 (including English Translation and Verification of Translation); mailed Jan. 13, 2011.

Original International Search Report issued in corresponding PCT Application No. PCT/CN2011/075352; mailed Oct. 20, 2011.

First Office Action (including partial English translation) issued in corresponding Chinese Patent Application No. 201110006813.8; mailed Aug. 31, 2012.

International Search Report issued in corresponding PCT Application No. PCT/CN2011/075352; mailed Oct. 20, 2011.

* cited by examiner

DATA PREFETCHING METHOD FOR DISTRIBUTED HASH TABLE DHT STORAGE SYSTEM, NODE, AND SYSTEM

This application is a continuation of International Application No. PCT/CN2011/075352, filed on Jun. 3, 2011, which claims priority to Chinese Patent Application No. 201110006813.8, filed on Jan. 13, 2011, all of which are hereby incorporated by reference in their entireties.

FIELD

The present disclosure relates to the field of information technologies, and in particular to a data prefetching method for a distributed hash table DHT storage system, a node, and a system.

BACKGROUND

As the network develops, information has an explosive increase. A pear to pear (Pear to Pear; P2P) storage system based on the distributed hash table (Distributed Hash Table; DHT) technology has an extremely high extendibility, and can support massive data storage. However, in a P2P storage system, a segment of consecutive data is partitioned into several blocks, and stored in several nodes in the system, so that a client cannot consecutively read data from the system, thereby causing a low data read efficiency.

In an existing data prefetching method for a DHT storage system, a client determines content and a storage location of data to be used next according to an access rule of an application program, and then the client reads data from each relevant storage unit and stores the data in the client, so that when an upper layer application needs the data, the upper layer application can directly acquire the data from the client without transmission through the network, thereby improving the read efficiency. However, the executing, by the DHT storage system, the data prefetching operation, must depend on the client, so that the prefetching method merely improves the communication efficiency from the client to each node, but the data read efficiency of the system is still not changed, that is, the data read efficiency of the system is still low.

SUMMARY

Embodiments of the present disclosure provide a data prefetching method for a distributed hash table DHT storage system, a node, and a system, so as to solve the problem of low read efficiency for the DHT storage system in the prior art.

An embodiment of the present disclosure provides a data prefetching method, which includes: receiving, by a first storage node, a read request sent by a client, wherein the read request indicates a to-be-read first data block; determining, by the first storage node, a second data block to-be-prefetched and a second storage node in which the second data block resides according to the first data block and a preset to-be-prefetched data block threshold, wherein a segment of consecutive row data are divided into a plurality of data blocks and the plurality of data blocks are stored in different storage nodes; sending, by the first storage node, a prefetching request to the second storage node, wherein the prefetching request includes identification information of the second data block, and the identification information is used to identify the second data block; and reading, by the second storage node, the second data block from a disk according to the prefetching request, storing, by the second storage node, the second data block in a local buffer of the second storage node, and providing, by the local buffer of the second storage node, the second data block to the client.

An embodiment of the present disclosure further provides a storage node, which includes: an analysis module and a notification module. The analysis module is configured to receive a read request that indicates a to-be-read first data block and sent by a client, and determine a second data block and a second storage node in which the second data block resides according to the first data block and a preset to-be-prefetched data block threshold. A segment of consecutive row data are divided into a plurality of data blocks and the plurality of data blocks are stored in different storage nodes. The notification module is configured to send a prefetching request to the storage node. The prefetching request includes identification information of the second data block, the identification information is used to identify the second data block.

The present disclosure further provides a distributed hash table DHT storage system, which includes multiple storage nodes provided in the embodiment of the present disclosure.

The present disclosure further provides a distributed storage system, which includes a first storage node and a second storage node. The first storage node is configured to receive a read request that indicates a to-be-read first data block sent by a client, determine a second data block and a second storage node in which the second data block resides according to a read data block and a set second data block threshold, and send a prefetching request to the second storage node, wherein the first storage node and the second storage node are same or different storage nodes, the prefetching request includes identification information of the second data block, and the identification information is used to uniquely identify the second data block, wherein a segment of consecutive row data are divided into a plurality of data blocks and the plurality of data blocks are stored in different storage nodes. The second storage node is configured to read the second data block from a disk according to the prefetching request sent by the first storage node, and store the second data block in a local buffer, so that the client reads the second data block from the local buffer of the second storage node.

According to the data prefetching method for a distributed hash table DHT storage system, the node, and the system provided in the embodiments of the present disclosure, the to-be-prefetched data block can be determined according to the read data block and the set to-be-prefetched data block threshold, and then the to-be-prefetched data block in the disk is downloaded to the buffer, so that when the read request is received from the client, the to-be-prefetched data block can be directly read from the buffer, thereby improving the data access efficiency for each storage node in the system, and saving the system resources.

BRIEF DESCRIPTION OF THE DRAWINGS

To illustrate the solutions according to the embodiments of the present disclosure or in the prior art more clearly, the accompanying drawings required for describing the embodiments or the prior art are introduced below briefly. Apparently, the accompanying drawings in the following descriptions merely show some of the embodiments of the present disclosure, and persons skilled in the art can obtain other drawings according to the accompanying drawings without creative efforts.

DETAILED DESCRIPTION OF THE EMBODIMENTS

In order to make the objectives, solutions, and advantages of the embodiments of the present disclosure more comprehensible, the solutions according to embodiments of the present disclosure are clearly and completely described in the following with reference to the accompanying drawings in the embodiments of the present disclosure. Apparently, the embodiments in the following description are merely a part rather than all of the embodiments. All other embodiments obtained by persons skilled in the art based on the embodiments of the present disclosure without creative efforts shall fall within the protection scope of the present disclosure.

Figure 1:
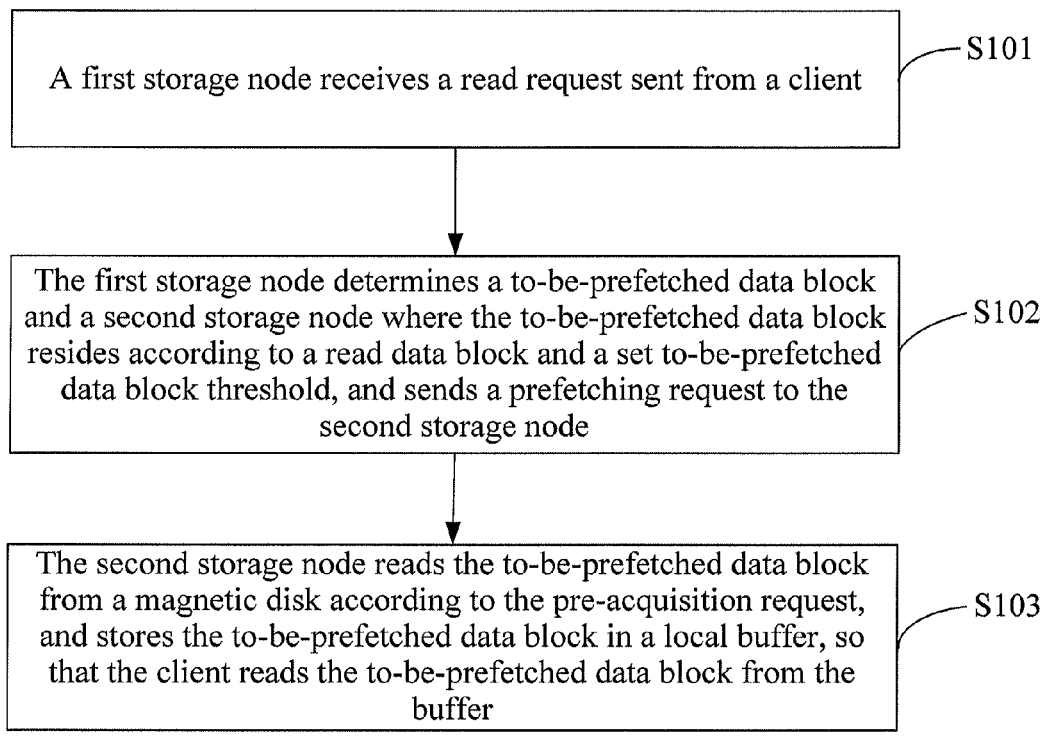
FIG. 1 is a flow chart of a first embodiment of a data prefetching method for a distributed hash table DHT storage system provided in the present disclosure.

FIG. 1 is a flow chart of a first embodiment of a data prefetching method for a distributed hash table DHT storage system provided in the present disclosure. As shown in FIG. 1, the method includes:

S101: A first storage node receives a read request sent by a client.

S102: The first storage node determines a to-be-prefetched data block and a second storage node where the to-be-prefetched data block resides according to a read data block and a set to-be-prefetched data block threshold, and sends a prefetching request to the second storage node, in which the first storage node and the second storage node are the same or different storage nodes, the prefetching request includes identification information of the to-be-prefetched data block, and the identification information is used to uniquely identify the to-be-prefetched data block.

S103: The second storage node reads the to-be-prefetched data block from a disk according to the prefetching request, and stores the to-be-prefetched data block in a local buffer, so that a client reads the to-be-prefetched data block from the local buffer of the second storage node.

Figure 2:
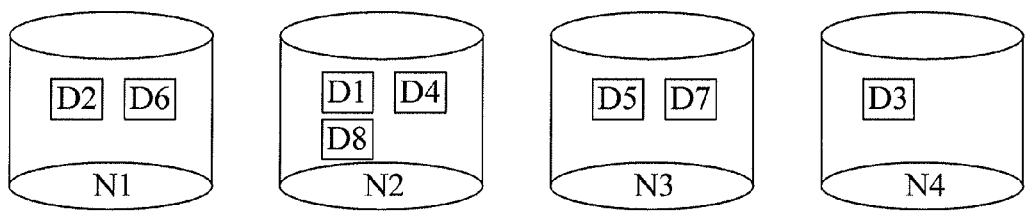
FIG. 2 is a schematic diagram of a data storage structure in a distributed hash table DHT storage system.

The data prefetching method for a distributed hash table DHT storage system provided in the present disclosure is applicable to a distributed hash table DHT storage system. This type of storage system stores data in a DHT manner, and during storing data, the storage system generally partitions a segment of consecutive data (that is, raw data) into several blocks, and stores the partitioned data blocks in several storage nodes in the system. For example, in a DHT storage system shown in FIG. 2, partitioned data blocks D1, D2 . . . D8 correspond to a segment of consecutive data, and the raw data is stored in disks of storage nodes N1, N2, N3, and N4. A data access method for each data block in the storage system may generally be get (key, &value), in which, key is a unique identification of a data block in the storage system, and value is data content of the data block. The disk for storing data may be, for example, a common integrated drive electronics (Integrated Drive Electronics; IDE) hard disk, a serial advanced technology attachment (Serial Advanced Technology Attachment; SATA) hard disk, or a solid state hard disk.

The first storage node, an execution body of S101 and S102, may be any storage node in the DHT storage system. After receiving a read request for reading a certain data block D1 sent by the client, the first storage node performs a prefetching operation. Specifically, because the data blocks in the raw data are sequentially numbered, which can be specifically reflected by key values of data blocks, the first storage node can determine a key value of a data block to be read after D1 according to a key value of the read data block D1 and also can further perform a DHT operation on the key value of the data block to be read, to acquire a second storage node where the data block resides, and send a prefetching request to the second storage node, in which the prefetching request includes identification information (a key value) of a to-be-prefetched data block, so that the second storage node performs a prefetching operation on the data block to be read after D1 according to the identification information.

It should be noted that the second storage node does not refer to one node in the system, and may be multiple storage nodes in the system. This is because a determined to-be-prefetched data block may be multiple. To-be-prefetched data blocks may be stored in different second storage nodes. Therefore, after determining the to-be-prefetched data blocks, each second storage node may read, from a disk, a data block to be pre-acquired, and then store the data block in a local buffer, that is, the second storage node downloads the to-be-prefetched data block in the disk to the local buffer, so that the client can directly read the data block from the local buffer. In addition, the second storage node and the first storage node may be the same storage node, that is, the at least one to-be-prefetched data block determined by the first storage node may be located in a local storage unit. In this case, the first storage node reads the to-be-prefetched data block from a local disk according to the identification information of the to-be-prefetched data block in the prefetching request, and stores the to-be-prefetched data block in a local buffer.

Because the performing of the prefetching operation is actually to save network transmission time of each data block and the capacity of the buffer in each storage node is limited, and factors are considered, for example, the factor that if more to-be-prefetched data blocks are stored in the buffer, the read rate is caused to decrease, a to-be-prefetched data block threshold is generally set, and the count of to-be-prefetched data blocks is limited by the to-be-prefetched data block threshold. The to-be-prefetched data block threshold is generally greater than or equal to a ratio of read time of a single data block to network transmission time of a single data block. In addition, the to-be-prefetched data block threshold may also be determined according to the buffer capacity in the storage node, and conditions of other hardware devices in each storage node, for example, a disk, a central processing unit (Central Processing Unit; CPU), a master board, and a network card.

After receiving the read request sent by the client, each storage node in the system checks whether the data block to be read exists in the buffer, that is, whether the data block to be read is pre-acquired. If the data block to be read exists in the buffer, the storage node can directly read the data block from the buffer, and return the data block to the client; and if the data block to be read does not exist in the buffer, it indicates that the data block is not pre-acquired, and the storage node can read the data block from the disk. During reading of the data block or after reading of the data block, each storage node may further trigger a new prefetching process as described above, which is not repeated herein again.

In the data prefetching method for a distributed hash table DHT storage system provided in this embodiment, the to-be-prefetched data block may be determined according to the read data block and the set to-be-prefetched data block threshold, and then the to-be-prefetched data block in the disk is downloaded to the buffer, so that after the read request is received from the client, the to-be-prefetched data block can be directly read from the buffer, thereby improving the data access efficiency for each storage node in the system.

Figure 3:
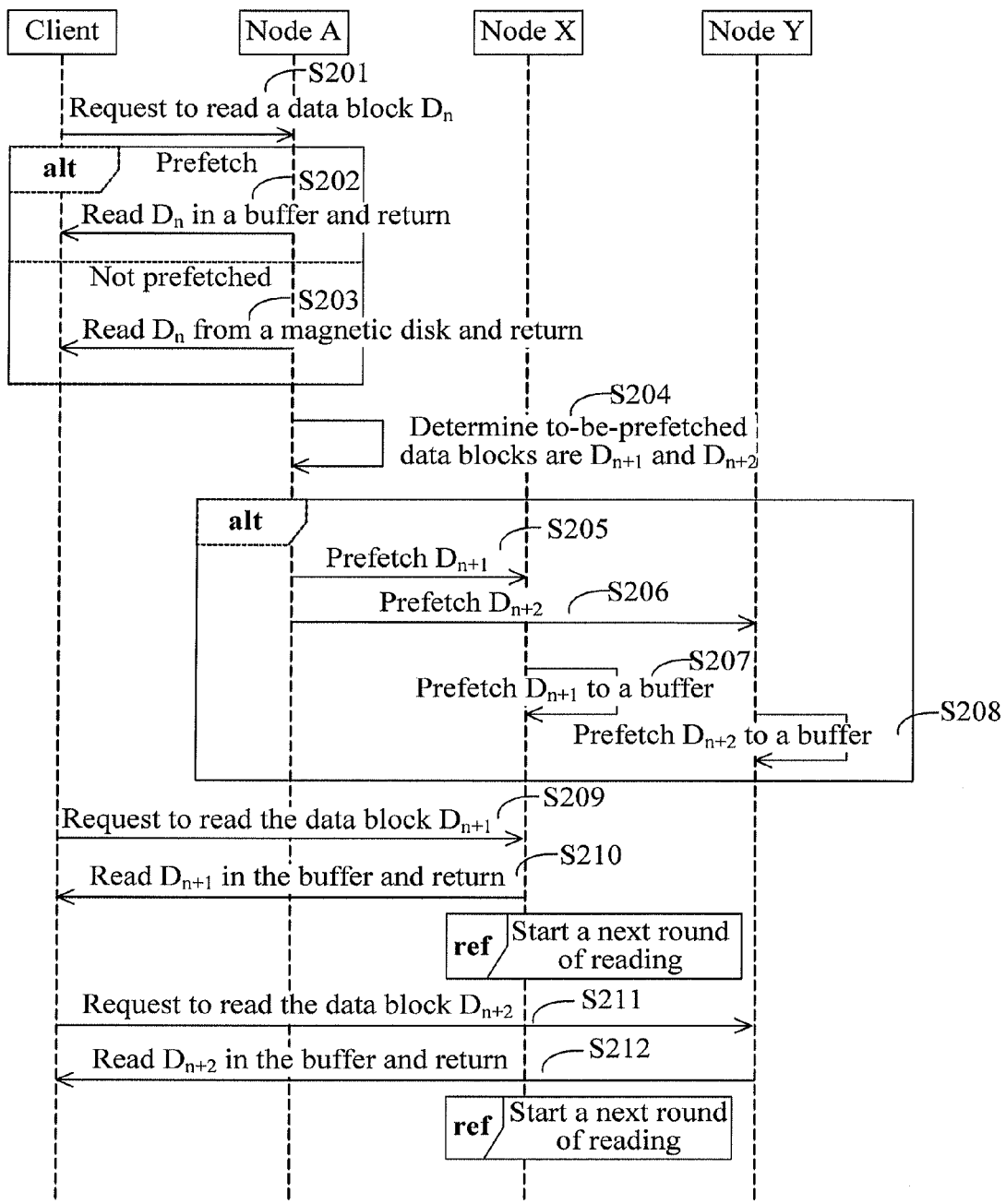
FIG. 3 is an interaction flow chart of performing, by each storage node in the data prefetching method for a distributed hash table DHT storage system shown in FIG. 1, the prefetching method.

To illustrate the first embodiment of the data prefetching method provided in the present disclosure more clearly, FIG. 3 provides an interaction flow chart of executing, by each storage node in a storage system, a prefetching method. As shown in FIG. 3, in this embodiment, description is made with reference to an example in which a client sends a read request for reading a data block Dn to a storage node A, and the storage node A triggers a prefetching operation. The method includes:

S201: A client finds a storage node A according to the key of Dn, and sends a read request to the storage node A.

A method for finding, by the client, the storage node according to the key of the data block may be a method in which a general DHT algorithm is used, which is not described in detail herein.

The client may initiate a data block read operation to the storage node A in multiple manners, for example, the client may initiate a data read operation to the node A by using a storage interface get (key, &value) provided by a DHT storage system, or initiate the data read operation according to a range of a key, or in other manners which are not enumerated herein.

S202: The storage node A queries the data block Dn in a buffer, if the data block Dn exists in the buffer, the storage node A directly retrieves Dn from the buffer, and returns Dn to the client.

S203: If Dn does not exist in the buffer, read Dn from a disk and return Dn to the client.

S204: The storage node A starts a prefetching operation process. For ease of description, it is assumed in this embodiment that the storage node A determines, according to Dn and a set to-be-prefetched data block threshold, that two data blocks which are Dn+1 and Dn+2 (two data blocks subsequent to Dn in raw data and having consecutive numbers with Dn in raw data) respectively need to be prefetched, and learns, according to a DHT algorithm, that Dn+1 and Dn+2 are stored in a storage node X and a storage node Y respectively. Then, S205 and S206 are performed.

S205: The storage node A sends a prefetching request of the data block Dn+1 to the storage node X.

S206: The storage node A sends a prefetching request of the data block Dn+2 to the storage node Y.

S205 and S206 have no particular order, and may be performed synchronously, or asynchronously.

S207: The storage node X receives the prefetching request of the data block Dn+1, and then performs a process of downloading the data block from a disk to a buffer.

S208: The storage node Y receives the prefetching request of the data block Dn+2, and then performs a process of downloading the data block from a disk to a buffer.

In S207 and S208, after receiving the prefetching requests sent by the storage node A, the storage node X and the storage node Y may directly download the corresponding data blocks from the disks to the buffers.

However, to improve the prefetching accuracy of the system, the storage node that receives the prefetching request may further determine whether the prefetching is required, and an operation for determining whether the prefetching is required is described in an embodiment below.

S209: When the client needs to read the data block Dn+1, the client finds the storage node X according to the key of Dn+1, and initiates a data block read operation to the storage node X by using the storage interface get (key, & value) provided by the DHT storage system.

S210: After receiving a request for reading the data block Dn+1, the storage node X finds that Dn+1 exists in the buffer, and directly returns Dn+1 in the buffer to the client.

S211: When the client needs to read the data block Dn+2, the client finds the storage node Y according to the key of Dn+2, and initiates a data block read operation to the storage node Y by using the storage interface get (key, & value) provided by the DHT storage system.

S212: After receiving a request for reading the data block Dn+2, the storage node Y finds that Dn+2 exists in the buffer, and directly returns Dn+2 in the buffer to the client.

Figure 4:
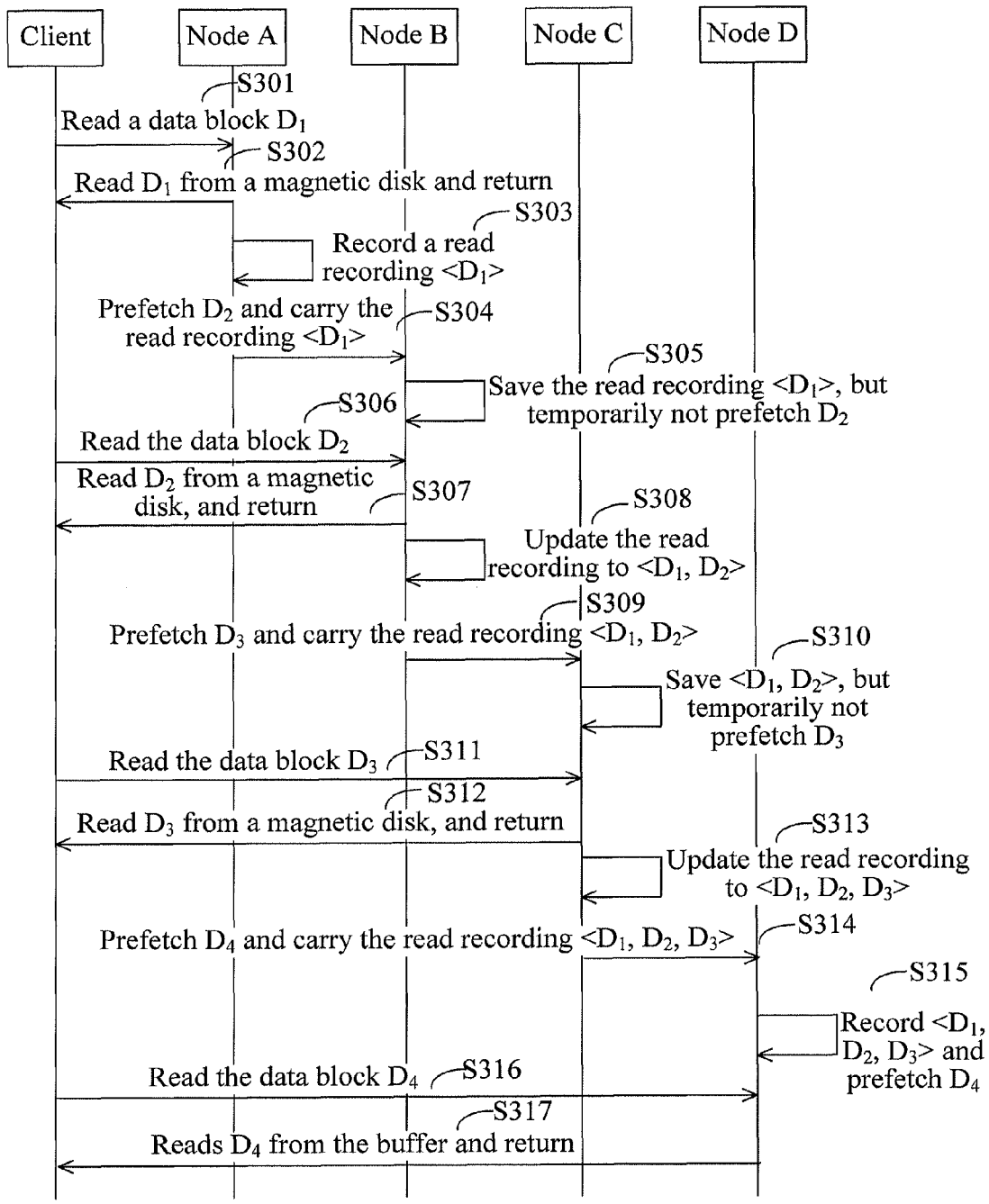
FIG. 4 is a flow chart of a second embodiment of a data prefetching method for a distributed hash table DHT storage system provided in the present disclosure.

FIG. 4 is a flow chart of a second embodiment of a data prefetching method for a distributed hash table DHT storage system provided in the present disclosure. As shown in FIG. 4, in the data prefetching method for a DHT system provided in this embodiment, after receiving a prefetching request, a storage node needs to further determine whether a prefetching operation is required, so as to improve the prefetching accuracy of the system. Specifically, after performing a read operation of a data block, each storage node records the read data block and a corresponding time stamp in a read recording table, in which the time stamp is used to identify read time of the data block. When receiving the prefetching request, the storage node determines whether to perform a prefetching operation according to the count of the read data block in the read recording table and a time stamp with latest read time. If the count of the read data block is greater than or equal to a set read data block threshold, and a difference between current pre-read time and the latest read time that is shown by the time stamp is less than or equal to set time, the prefetching operation is performed.

The reason for setting the read data block threshold in the read recording is that if a client reads only a very few of data blocks, it does not necessarily indicate that the client undoubtedly reads the data blocks in raw data sequentially, and this may cause an inaccurate determination of sequential read, and consequentially cause unnecessary prefetching. However, the read data block threshold cannot be set to be very large, because this may cause a low prefetching efficiency at an earlier stage, and increase the system consumption during transferring and saving the read recording. Therefore, the read data block threshold may be set according to, for example, the count of data blocks in the raw data and system hardware configurations.

In addition, the difference between the current pre-read time and the latest read time that is shown by the time stamp needs to be less than or equal to certain time, it indicates that a to-be-prefetched data block and the read data blocks all correspond to a current raw data read operation of the client, instead of a previous raw data read operation of the client.

This embodiment provides a process of reading D1-D4 that is triggered by the client, in which it is assumed that the prefetching operation is performed when the set read data block threshold in the read recording is 3. The method specifically includes:

S301: A client requests a storage node A to read a data block D1.

S302: It is assumed that D1 is a first data block read by the client, the storage node A reads the data block D1 from a disk and returns the data block D1 to the client.

S303: The storage node A records <D1> (including a time stamp of D1) in a read recording, in which the read recording table corresponds to the same segment of raw data.

S304: The storage node A analyzes and learns that D2 is subsequent to the data block D1, calculates a storage node B storing D2, sends a prefetching request of D2 to the storage node B, and carries the block read recording <D1>.

A process in which the storage node A analyzes D2 may be: determining the count of to-be-prefetched data blocks according to a set to-be-prefetched data block threshold. Because a read data block and the to-be-prefetched data block belong to the same raw data, the read data block and the to-be-prefetched data block have the same prefix, and the read data block and the to-be-prefetched data block are sequentially numbered in the raw data, in which the prefix is a unique identification of the raw data to which a data block belongs, and a number identifies a location of data in the raw data. Therefore, the storage node A may determine a prefix and the number of the to-be-prefetched data block according to a prefix and the number of the read data block D1, and then performs a hash operation on the to-be-prefetched data block according to the prefix and the number of the to-be-prefetched data block, so as to determine a storage node of the to-be-prefetched data block.

S305: After receiving the prefetching request from the storage node A, the storage node B finds that the read data block in the read recording is only D1, and the storage node B only saves the read recording, but does not execute a prefetching operation.

S306: The client requests the storage node B to read the data block D2.

S307: Because the storage node B does not pre-acquire D2, the storage node B reads the data block D2 from a disk, and returns the data block D2 to the client.

S308: The storage node B updates the read recording to <D1, D2> (including a time stamp of D2).

S309: The storage node B analyzes D3 and learns that D3 is subsequent to the data block D2, calculates a location of D3, sends a prefetching request of D3 to a storage node C where D3 resides, and carries the block historical recording <D1, D2>.

S310: After receiving the prefetching request from the storage node B, the storage node C finds that the read recording includes 2 read data blocks, which are less than a read data block threshold 3, and the storage node C only saves the read recording, but does not execute a prefetching operation.

S311: The client requests the storage node C to read the data block D3.

S312: Because the storage node C does not pre-acquire D3, the storage node C reads the data block D3 from a disk, and returns the data block D3 to the client.

S313: The storage node C updates the read recording to <D1, D2, D3> (including a time stamp of D3).

S314: The storage node C analyzes D4 and learns that D4 is subsequent to the data block D3, calculates a location of D4, sends a prefetching request of D4 to a node storage D where D4 resides, and carries the block recording <D1, D2, D3>.

S315: After receiving the prefetching request from the storage node C, the storage node D finds that the read recording includes 3 read data blocks, which are equal to the read data block threshold 3, and the storage node D further determines whether a difference between current pre-read time and latest read time shown by the time stamp is less than or equal to set time, and it is assumed herein that the difference is less than or equal to the set time, so the storage node saves the read recording, reads D4 from a disk, and stores D4 in a buffer.

S316: The client requests the storage node D to read the data block D4.

S317: Because the storage node D has pre-acquired D4, the storage node D directly reads the data block D4 from the buffer and returns the data block D4 to the client.

Then, the storage node D still performs a prefetching operation of a data block, which is not repeated herein again.

In addition, because once the count of the read data blocks in the read recording is equal to the set read data block threshold, read may be performed, in order to improve the time for performing prefetching determination by the storage node, and save a storage space of the read recording table, if the count of the data block in the read recording table is greater than the set read data block threshold, a previously read data block is deleted according to a time stamp, so that the count of the data blocks in the recording table is equal to the set read data block threshold.

It should be noted that in order to ensure the agreement of a content with a data block in a disk, if a to-be-prefetched data block in a buffer is rewritten, the same data block in the disk needs to be synchronously rewritten; likewise, if a data block in the disk is rewritten, the same to-be-prefetched data block in the buffer needs to be synchronously rewritten. A certain data structure may be used to record a relation between the to-be-prefetched data block in the buffer and the data block in the disk, so that when the data block in the disk data block is changed, the to-be-prefetched data block can be synchronously modified.

Persons skilled in the art should understand that, all or a part of processes in the method according to the embodiments may be accomplished by relevant hardware under instructions of a computer program. The program may be stored in a computer-readable storage medium. When the program is executed, the process of the method according to the embodiments is performed. The storage medium may be a disk, a disc, a read-only memory (Read-Only Memory, ROM), a random access memory (Random Access Memory, RAM), and the like.

Figure 5:
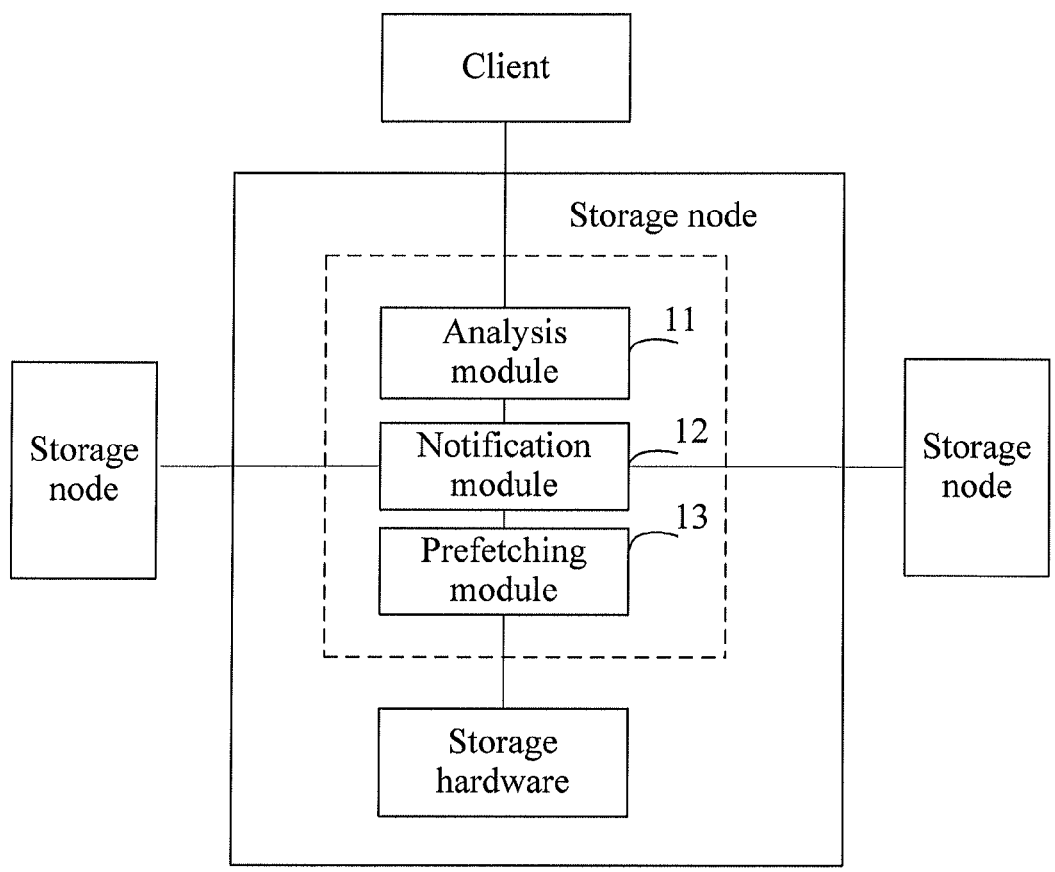
FIG. 5 is a schematic structural diagram of a first embodiment of a storage node of a distributed hash table DHT storage system provided in the present disclosure.

FIG. 5 is a schematic structural diagram of a first embodiment of a storage node of a distributed hash table DHT storage system provided in the present disclosure. As shown in FIG. 5, the apparatus includes an analysis module 11, a notification module 12, and a prefetching module 13.

The analysis module 11 is configured to receive a read request sent by a client, and determine a to-be-prefetched data block and a storage node where the to-be-prefetched data block resides according to a read data block and a set to-be-prefetched data block threshold.

The notification module 12 is configured to send a prefetching request to the storage node, in which the prefetching request includes identification information of the to-be-prefetched data block, the identification information is used to uniquely identify the to-be-prefetched data block, and at least one data block is the to-be-prefetched data block.

The prefetching module 13 is configured to read the to-be-prefetched data block determined by the analysis module 11 from a disk according to the prefetching request, and store the to-be-prefetched data block in a local buffer, so that the client reads the to-be-prefetched data block from the local buffer.

According to the storage node of the distributed hash table DHT storage system provided in this embodiment, the to-be-prefetched data block can be determined according to the read data block and the set to-be-prefetched data block threshold, and then the to-be-prefetched data block in the disk is downloaded to the buffer, so that when the read request is received from the client, the to-be-prefetched data block may be directly read from the buffer, thereby improving the data access efficiency for each storage node in the system, and saving the system resources.

Figure 6:
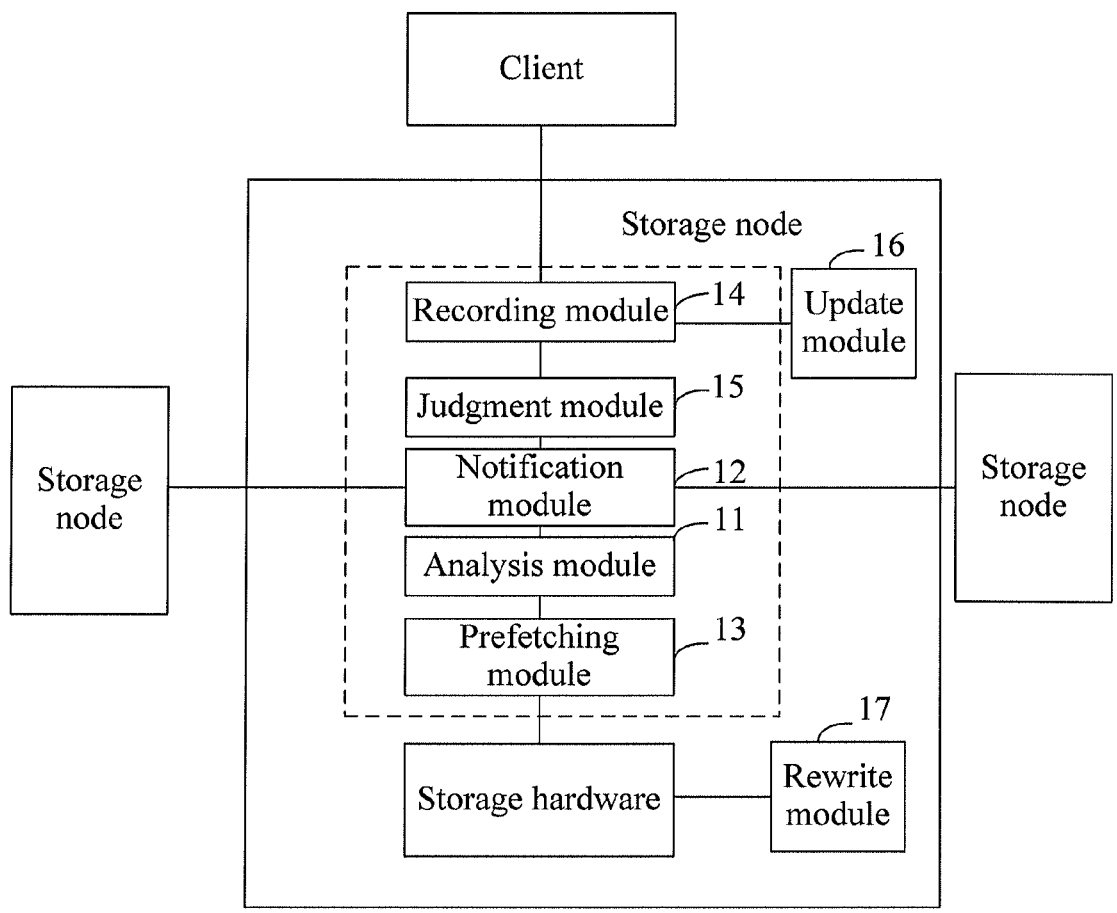
FIG. 6 is a schematic structural diagram of a second embodiment of a storage node of a distributed hash table DHT storage system provided in the present disclosure.

FIG. 6 is a schematic structural diagram of a second embodiment of a storage node of a distributed hash table DHT storage system provided in the present disclosure. As shown in FIG. 6, the apparatus includes an analysis module 11, a notification module 12, and a prefetching module 13.

On the basis of the foregoing embodiment, the storage node may further include:

a recording module 14, configured to record the read data block and a time stamp thereof in a read recording table, in which the time stamp is used to identify read time of the data block.

The prefetching request sent by the notification module 12 further includes the read recording table.

Furthermore, the storage node may further include:

a determination module 15, configured to determine whether the to-be-prefetched data block needs to be pre-acquired according to a count of the read data block and a time stamp with latest read time in the read recording table recorded by the recording module 14.

If the determination module 15 determines that the count of the read data blocks is greater than or equal to a set read data block threshold, and a difference between current pre-read time and the latest read time that is shown by the time stamp is less than or equal to set time, the prefetching module 13 reads the to-be-prefetched data block from the disk, and stores the to-be-prefetched data block in the local buffer.

Moreover, the storage node may further include:

an update module 16, configured to delete a previously read data block according to a time stamp if the count of the data block recorded in the read recording table by the recording module 14 is greater than the set read data block threshold, so that the count of the data block recorded in the recording table is equal to the set read data block threshold.

In addition, the analysis module 11 may be specifically configured to determine a count of the to-be-prefetched data block according to the set to-be-prefetched data block threshold;

determine the identification information of the to-be-prefetched data block according to identification information of the read data block, in which the identification information is a prefix and a number, the prefix is a unique identification of raw data to which the data block belongs, and the number identifies a location of the data block in the raw data; and perform a hash operation on the to-be-prefetched data block according to the prefix and the number of the to-be-prefetched data block, so as to determine the storage node of the to-be-prefetched data block.

Furthermore, the prefetching module 13 may be further specifically configured to determine whether the to-be-prefetched data block exists in the local buffer according to the identification information; and if the to-be-prefetched data block does not exist in the local buffer, read the to-be-prefetched data block from the disk according to the identification information, and store the to-be-prefetched data block in the local buffer, so that the client reads the to-be-prefetched data block from the local buffer.

The apparatus further includes:

a rewrite module 17, configured to rewrite the to-be-prefetched data block in the local buffer, and synchronously rewrite the same data block in the disk; and further configured to rewrite the data block in the disk, and synchronously rewrite the same to-be-prefetched data block in the local buffer.

Figure 7:
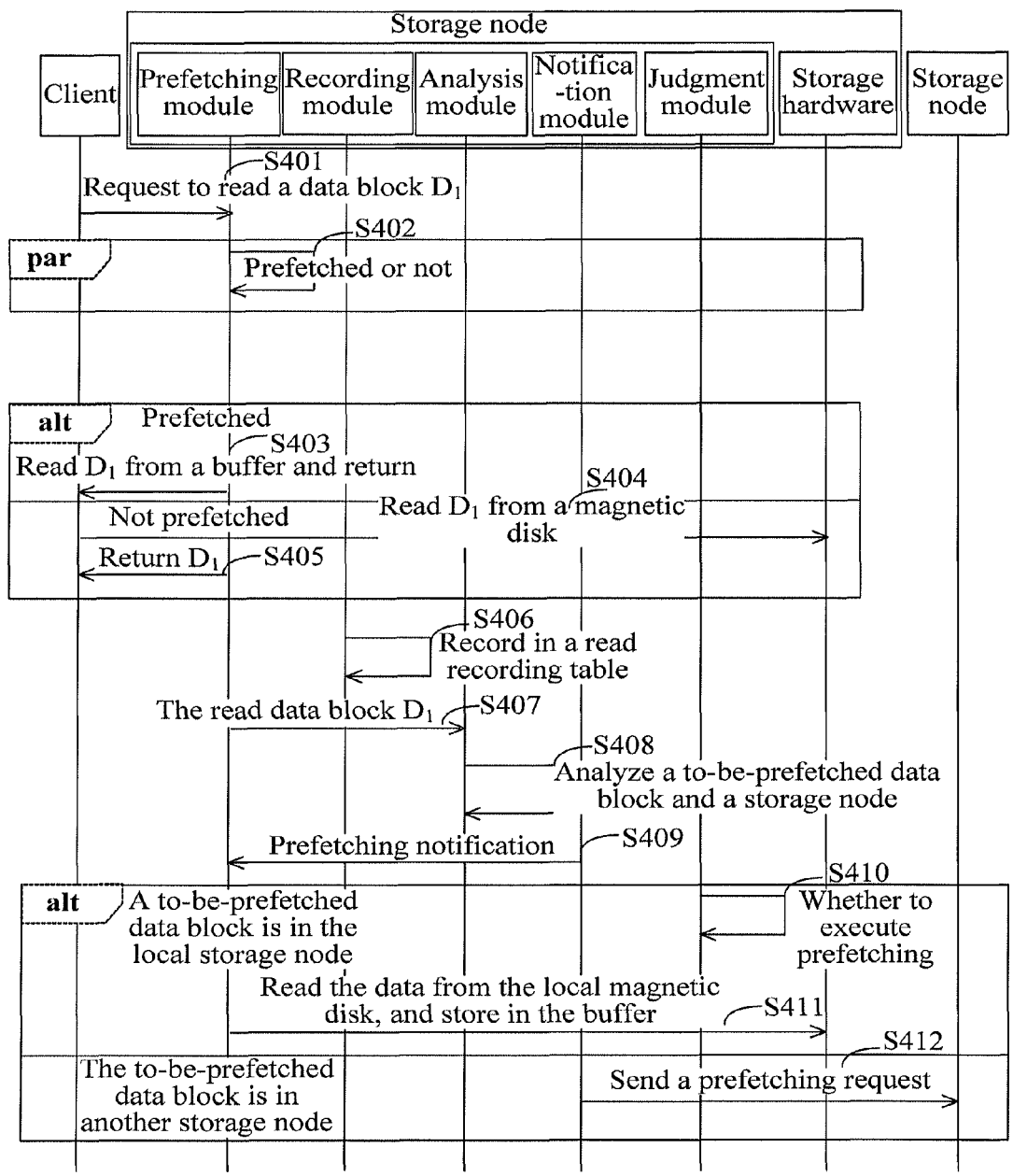
FIG. 7 shows a main process for processing, by a storage node of a distributed hash table DHT storage system, a read request provided in an embodiment of the present disclosure.

The storage node of a distributed hash table DHT storage system provided in FIG. 5 and FIG. 6 may be any storage node in a DHT storage system, and storage hardware shown in FIG. 5 and FIG. 6 includes, for example, the buffer, the disk, a CPU, a master board, and a network card. Specific operations performed by the storage node in executing a data prefetching method for a distributed hash table DHT storage system may be made reference to the descriptions in the foregoing embodiments. FIG. 7 shows a main process in which a storage node of a distributed hash table DHT storage system processes a read request provided in an embodiment of the present disclosure. FIG. 7 does not show all modules in the storage node and relevant operations thereof, and details for a process of executing, by the storage node, a prefetching operation may be made reference to the methods in the foregoing embodiments. Referring to FIG. 7, the process specifically includes:

S401: A client requests a storage node to read a data block D1.

It should be noted that because what is provided in the present disclosure is a data block prefetching method for a DHT storage system, a relevant function module for executing a prefetching operation is mainly described in the embodiments of the storage nodes of a DHT storage system provided in the present disclosure, and a relevant function module for executing a read request is not specifically described. However, the module for executing the prefetching operation and the module for executing the read operation may be actually the same function unit in the storage node. For ease of description, a prefetching module 13 provided in the embodiment of the present disclosure can serve as an execution module for executing the prefetching operation and the read operation.

Therefore, in S401, a module receiving a request for reading the data block D1 sent by the client is the prefetching module 13.

S402: The prefetching module 13 of the storage node queries D1 in a buffer, and determines whether the data block D1 is pre-acquired.

S403: If the data block D1 is pre-acquired, the prefetching module 13 directly acquires the data block D1 from the buffer and returns the data block D1 to the client.

S404: if the data block D1 is not pre-acquired, the prefetching module 13 reads the data block D1 from a disk.

S405: Return the data block D1 to the client.

S406: A recording module 14 records <D1> (including a time stamp of D1) in a read recording.

S407: A prefetching module 13 notifies the read data block to an analysis module 11.

S408: The analysis module 11 analyzes a count of data blocks that need to be pre-acquired subsequently and a storage node; if a to-be-prefetched data block is located in the local storage node, S409 is performed; and if the to-be-prefetched data block is located in another storage node, S412 is performed.

S409: A notification module 12 sends a prefetching request to the local prefetching module 13.

S410: A determination module 15 determines whether to pre-acquire the to-be-prefetched data block; and if yes, S411 is performed.

S411: The prefetching module 13 reads the data block from the local disk, and stores it in the buffer.

S412: The notification module 12 may send a prefetching request to another storage node.

In this embodiment, only the read operation performed after any storage node in a DHT storage system receives the read request sent by the client and the main process for triggering the prefetching operation are described, and details for a process of performing, by the storage node, the prefetching operation may be made reference to the methods in the foregoing embodiments, which is not repeated herein again.

Figure 8:
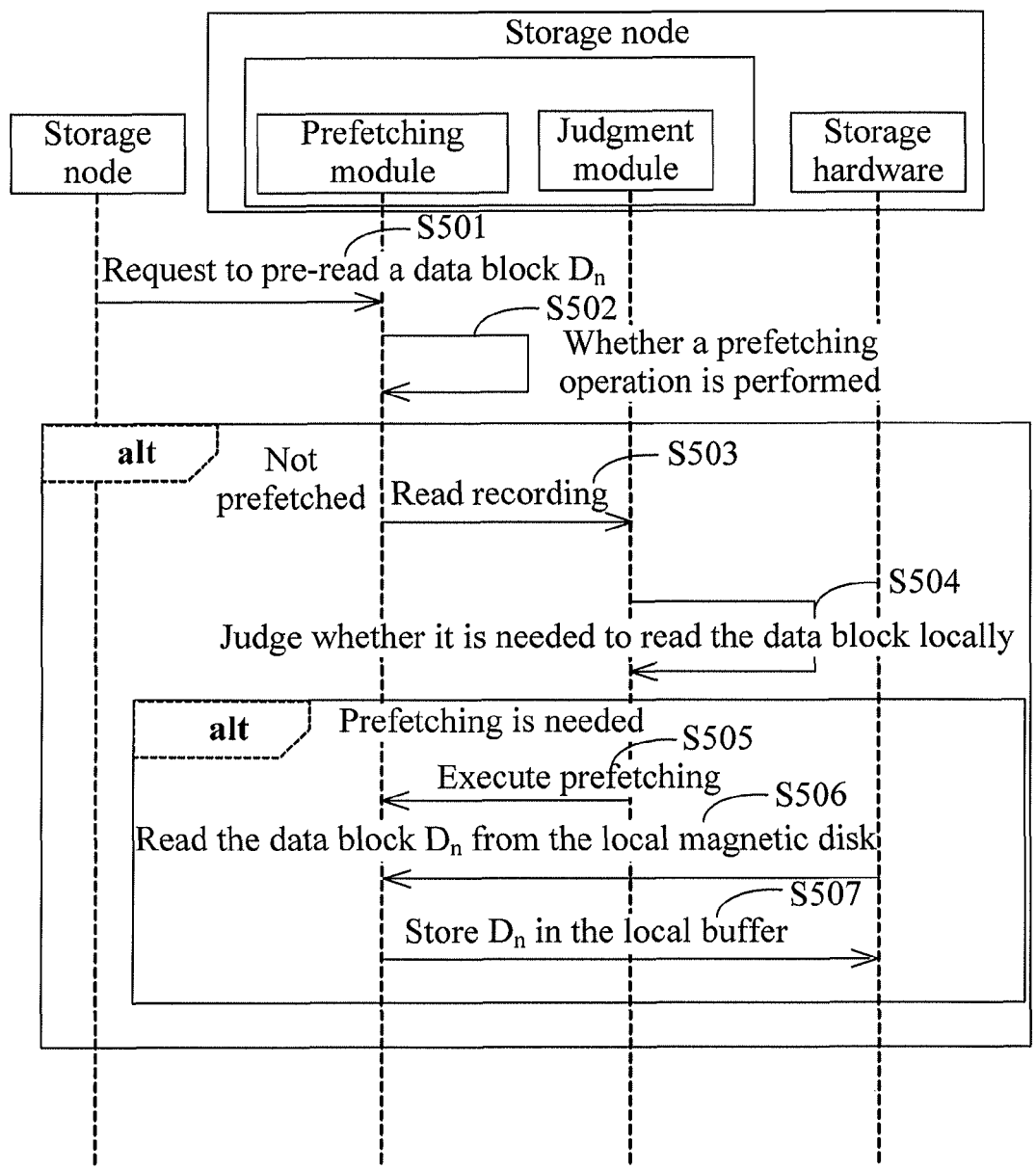
FIG. 8 shows a main process performed by a storage node of a distributed hash table DHT storage system after receiving a prefetching request provided in an embodiment of the present disclosure.

FIG. 8 shows a main process performed by a storage node of a distributed hash table DHT storage system after receiving a prefetching request provided in an embodiment of the present disclosure. FIG. 8 does not show all modules in the storage node and relevant operations thereof, and details for a process of executing, by the storage node, a prefetching operation may be made reference to the methods in the foregoing embodiments. As shown in FIG. 8, the process specifically includes:

S501: A prefetching module 13 of the storage node receives a request for pre-reading Dn sent by another storage node, in which the request carries read recording of raw data.

S502: The prefetching module 13 determines whether the data block Dn locates in a buffer, if the data block Dn locates in the buffer, it indicates that a prefetching operation has performed on the data block, and the prefetching operation is not performed any more; otherwise, S503 is performed.

S503: The prefetching module 13 delivers the read recording of the raw data to a determination module 15.

S504: The determination module 15 determines whether it is required to download Dn from a local disk to a buffer; if required, S505 is performed.

S505: The determination module 15 delivers a prefetching execution instruction to the prefetching module 13.

S506: The prefetching module 13 reads Dn from the local disk.

S507: The prefetching module 13 stores the read Dn in the local buffer.

The present disclosure further provides an embodiment of a distributed hash table DHT storage system, and the system includes multiple storage nodes provided in the embodiments of the present disclosure. Structural diagrams of the system may be made reference to FIG. 5 and FIG. 6.

In an exemplary embodiment, the DHT storage system may include a first storage node and a second storage node.

The first storage node is configured to receive a read request sent by a client, determine a to-be-prefetched data block and a second storage node where the to-be-prefetched data block resides according to a read data block and a set to-be-prefetched data block threshold, and send a prefetching request to the second storage node, in which the first storage node and the second storage node are the same or different storage nodes, the prefetching request includes identification information of the to-be-prefetched data block, and the identification information is used to uniquely identify the to-be-prefetched data block.

The second storage node is configured to read the to-be-prefetched data block from a disk according to the prefetching request sent by the first storage node, and store the to-be-prefetched data block in a local buffer, so that the client reads the to-be-prefetched data block from the local buffer of the second storage node.

In addition, the first storage node may be further configured to record the read data block and a time stamp thereof in a read recording table, in which the time stamp is used to identify read time of the data block, and the read recording table corresponds to the same segment of raw data.

The prefetching request sent by the first storage node to the second storage node further includes the read recording table.

Furthermore, the second storage node may be further configured to determine whether the to-be-prefetched data block needs to be pre-acquired according to the count of the read data block and a time stamp with latest read time in the read recording table.

If the count of the read data block is greater than or equal to a set read data block threshold, and a difference between current pre-read time and the latest read time that is shown by the time stamp is less than or equal to set time, the to-be-prefetched data block is read from the disk, and the to-be-prefetched data block is stored in the local buffer.

Moreover, the first storage node may be further specifically configured to determine the count of the to-be-prefetched data block according to the set to-be-prefetched data block threshold.

The identification information of the to-be-prefetched data block is determined according to identification information of the read data block, where the identification information is a prefix and a number, the prefix is a unique identification of the raw data to which the data block belongs, and the number identifies a location of the data block in the raw data.

Hash operation is performed on the to-be-prefetched data block according to the prefix and the number of the to-be-prefetched data block, to determine the to-be-prefetched data block and the second storage node where the to-be-prefetched data block resides, and the prefetching request is sent to the second storage node.

In the distributed hash table DHT storage system provided in this embodiment, each storage node interacts to execute a process of a data prefetching operation, which may be made reference to the data prefetching method for a distributed hash table DHT provided in the present disclosure, and is not further repeated herein.

Finally, it should be noted that the foregoing embodiments are merely provided for describing the solutions of the present disclosure, but not intended to limit the present disclosure. It should be understood by persons skilled in the art that although the present disclosure has been described in detail with reference to the foregoing embodiments, modifications can be made to the solutions described in the foregoing embodiments, or equivalent replacements can be made to some features in the solutions, as long as such modifications or replacements do not cause the essence of corresponding solutions to depart from the spirit and scope of the present disclosure.

What is claimed is:

1. A data prefetching method comprising:
  receiving, by a first storage node, a read request sent by a client, wherein the read request indicates a to-be-read first data block in the first storage node;
  recording, by the first storage node, read recording of the first data block and a time stamp in a read recording table, wherein the time stamp for identifying read time of the first data blocks, and the read recording table corresponds to a same segment of raw data;
  determining, by the first storage node, a second data block to-be-prefetched and a second storage node where the second data block resides according to the first data block and a preset to-be-prefetched data block threshold;

sending, by the first storage node, a prefetching request to the second storage node, the prefetching request comprises identification information of the second data block and the read recording table, and the identification information is used to identify the second data block; and reading, by the second storage node, the second data block from a disk according to the prefetching request, and storing the second data block in a local buffer of the second storage node, so that the client reads the to-be-prefetched data block from the local buffer of the second storage node.

2. The method according to claim 1, wherein before the reading, by the second storage node, the second data block from the disk according to the prefetching request, and storing the second data block in the local buffer of the second storage node, the method further comprises:

judging, by the second storage node, whether the second data block needs to be prefetched according to a count of read data blocks and a time stamp with latest read time in the read recording table; and if the count of read data blocks is greater than or equal to a set read data block threshold, and a difference between current pre-read time and the latest read time that is shown by the time stamp is less than or equal to set time, reading, by the second storage node, the second data block from the disk, and storing the second data block in the local buffer.

3. The method according to claim 2, further comprising:

if the count of the read data blocks in the read recording table is greater than the set read data block threshold, deleting a previously read data block according to a time stamp, so that the count of the read data block in the recording table is equal to the set read data block threshold.

4. The method according to any one of claims 1, wherein the determining, by the first storage node, the second data block and the second storage node in which the second data block resides according to the read data block and the set second data block threshold, and sending the prefetching request to the second storage node comprises:

determining, by the first storage node, a count of the second data block according to the preset to-be-prefetched data block threshold;

determining, by the first storage node, the identification information of the second data block according to identification information of the read data block, wherein the identification information is a prefix and a number, the prefix is a unique identification of the segment of consecutive row data, and the number identifies a location of the second data block in the segment of consecutive row data; and performing a hash operation on the second data block according to the prefix and the number of the second data block, to determine the second data block and the second storage node in which the second data block resides, and sending the prefetching request to the second storage node.

5. The method according to claim 4, wherein the reading, by the second storage node, the second data block from the disk according to the prefetching request, and storing the second data block in the local buffer is specifically:

judging, by the second storage node, whether the second data block exists in the local buffer of the second storage node according to the identification information; and if the second data block does not exist in the local buffer of the second storage node, reading, by the second storage node, the second data block from the disk according to the identification information, and storing the second data block in the local buffer of the second storage node.

6. The method according to claim 5, further comprising:

if the second storage node rewrites the second data block in the local buffer of the second storage node, synchronously rewriting, by the second storage node, the same data block in the disk;

or if the second storage node rewrites the data block in the disk, synchronously rewriting, by the second storage node, the second data block in the second storage node.

7. A storage node comprising:

an analysis module, configured to receive a read request that indicates a to-be-read first data block in a first storage node sent by a client, and determine a second data block and a second storage node where the second data block resides according to the first data block and a preset to-be-prefetched data block threshold;

a recording module, configured to record read recording of the first data block and a time stamp in a read recording table, wherein the time stamp for identifying read time of the first data blocks, and the read recording table corresponds to a same segment of raw data;

a notification module, configured to send a prefetching request, by the first storage node, to the second storage node, the prefetching request comprises identification information of the second data block and the read recording table, the identification information is used to identify the second data block;

a prefetching module, configured to read the second data block determined by the analysis module from a disk according to the prefetching request, and store the second data block in a local buffer of the second node, so that the client reads the second data block from the local buffer.

8. The storage node of the claim 7, further comprising:

a judgment module, configured to judge whether the second data block needs to be prefetched according to a count of read data blocks and a time stamp with latest read time in the read recording table recorded by the recording module;

wherein if the judgment module judges that the count of read data blocks is greater than or equal to a set read data block threshold, and a difference between current pre-read time and the latest read time that is shown by the time stamp is less than or equal to set time, the prefetching module reads the second data block from the disk, and stores the second data block in the local buffer.

9. The storage node of the claim 8, further comprising:

an update module, configured to delete a previously read data block according to a time stamp if the count of the read data block recorded in the read recording table by the recording module is greater than the set read data block threshold, so that the count of the read data block recorded in the recording table is equal to the set read data block threshold.

10. The storage node claim 7, wherein the analysis module is specifically configured to:

determine a count of the second data block according to the set second data block threshold;

determine the identification information of the second data block according to identification information of the read data block, wherein the identification information is a prefix and a number, the prefix is a unique identification of the segment of consecutive row data, and the number identifies a location of the second data block in the segment of consecutive row data; and perform a hash operation on the second data block according to the prefix and the number of the second data block, so as to determine the storage node of the second data block.

11. The storage node of the claim 10, wherein the prefetching module is specifically configured to:

judge whether the second data block exists in the local buffer according to the identification information; and if the second data block does not exist in the local buffer, read the second data block from the disk according to the identification information, and store the second data block in the local buffer, so that the client reads the second data block from the local buffer.

12. The storage node of claim 11, further comprising:

a rewrite module, configured to rewrite the second data block in the local buffer of the second storage node, and synchronously rewrite the same data block in the disk; and further configured to rewrite the data block in the disk, and synchronously rewrite the second data block in the local buffer.

13. A storage system, comprising a first storage node and a second storage node, wherein the first storage node is configured to receive a read request that indicates a to-be-read first data block in the first storage node sent by a client, determine a second data block and a second storage node where the second data block resides according to a read data block and a set second data block threshold, record read recording of the first data block and a time stamp in a read recording table, wherein the read recording table corresponds to a same segment of raw data, and send, by the first storage node, a prefetching request to the second storage node, the prefetching request comprises identification information of the second data block and the read recording table, and the identification the time stamp for identifying read time of the first data blocks information is used to identify the second data block, wherein a segment of consecutive row data are divided into a plurality of data blocks and the plurality of data blocks are stored in different storage nodes; and the second storage node is configured to read the second data block from a disk according to the prefetching request sent by the first storage node, and store the second data block in a local buffer, so that the client reads the second data block from the local buffer of the second storage node.

14. The storage system according to claim 13, wherein the second storage node is further configured to judge whether the second data block needs to be pre-acquired according to a count of the read data block and a time stamp with latest read time in the read recording table; and if the count of read data block is greater than or equal to a set read data block threshold, and a difference between current pre-read time and the latest read time that is shown by the time stamp is less than or equal to set time, read the second data block from the disk, and store the second data block in the local buffer.

15. The storage system according to claim 13, wherein the first storage node is specifically configured to determine a count of the second data block according to the set to-be-prefetched data block threshold;

determine the identification information of the second data block according to identification information of the read data block, wherein the identification information is a prefix and a number, the prefix is a unique identification of the raw data to which the data block belongs, and the number identifies a location of the data block in the raw data; and perform a hash operation on the second data block according to the prefix and the number of the to-be-prefetched data block, to determine the second data block and the second storage node where the to-be-prefetched data block resides, and send the prefetching request to the second storage node.

* * * * *